Aug. 9, 1927.
A. PANAJIOTAROS ET AL
1,638,452
SELF BASTING ROTARY ROASTER
Filed Dec. 7, 1925
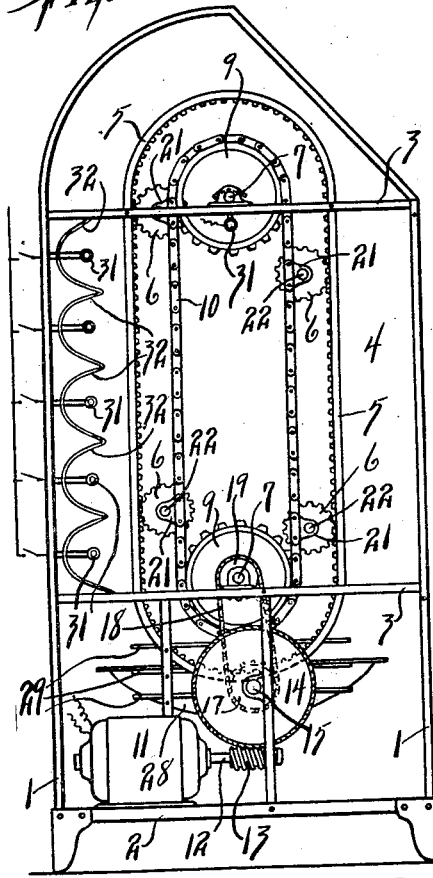
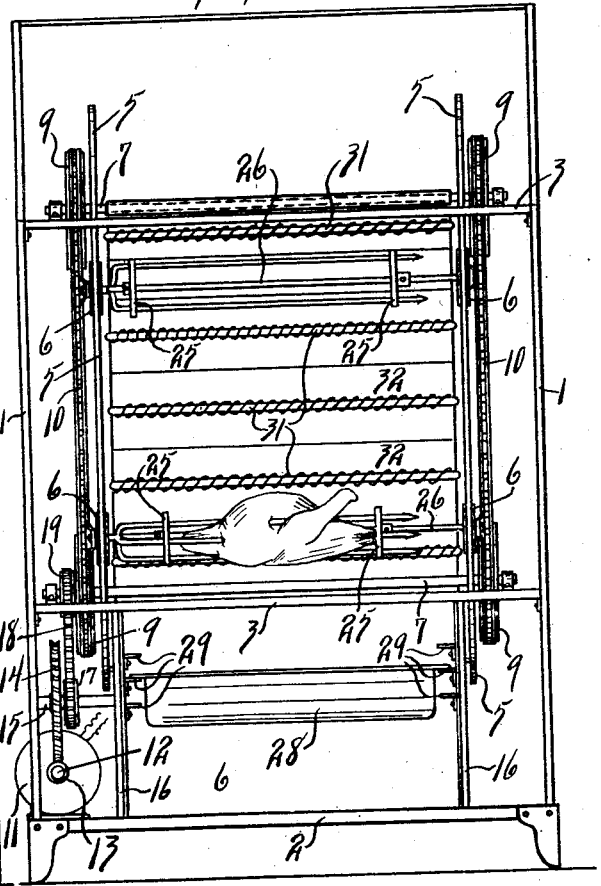
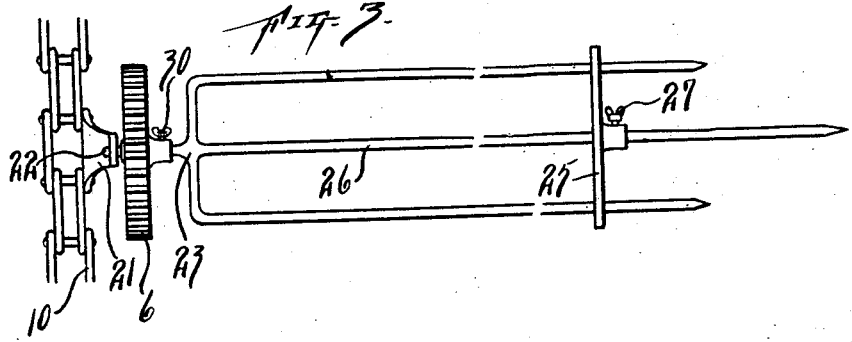
Inventor
ATHANASIOS PANAJIOTAROS
and
MORTIMER JONES.
Attorney Patented Aug. 9, 1927.

1,638,452

UNITED STATES PATENT OFFICE.

ATHANASIOS PANAJIOTAROS AND MORTIMER JONES, OF FORT WORTH, TEXAS; SAID PANAJIOTAROS NOW BY JUDICIAL CHANGE OF NAME TOM PETERS.

SELF-BASTING ROTARY ROASTER.

Application filed December 7, 1925. Serial No. 73,649.

Our invention relates to self basting rotary roasters; and the object is to provide a simple and practical machine for baking or cooking meats of various kinds and to provide means for applying the seasoning liquids,—gravy, sauce, and the like automatically and with regularity, and to provide a heating means which will not burn or scorch the meat. One of the advantages of this machine is that the seasoning liquids are constantly applied to the meat to keep the meat from being cooked too much in parts. Other objects and advantages will be fully explained in the following description and the invention will be more particularly pointed out in the claims.

Reference is had to the accompanying drawings which form a part of this application.

Fig. 1 is a side elevation of the machine.
Fig. 2 is a front elevation of the same.
Fig. 3 is a detail view of one of the forks or holders.

Similar characters of reference are used to indicate the same parts throughout the several views.

The machine is provided with a frame having upright members 1, a base 2, and horizontal connecting members 3. The machine is provided with glass panels for inclosing the working mechanism. The glass panels 4 and 6' may be supported by the frame pieces 1, 2 and 3. Tracks 5 are attached to the cross frame members 3. These tracks have racks for driving the pinions 6. Shafts 7 are journaled in bearings 8 which are mounted on the cross-frame members 3. Cog wheels 9 are rigid with the shafts 7 and drive sprocket chains 10. A motor 11 is provided with a shaft 12 which carries and drives a worm wheel 13. The wheel 13 meshes with and drives a worm wheel 14 which is rigid with a shaft 15. The machine is provided with bracket supporting frame members 16 which are rigid with frame members 2 and 3. The shaft 15 is journaled in a frame member 1 and in a bracket frame 16. A sprocket wheel 17 is rigid with shaft 15 and drives a sprocket chain 18. The chain 18 drives a sprocket wheel 19 which is rigid with the shaft 7 and drives the shaft 17. The shaft 17 drives the carrier chains 10. Bearing brackets 21 are attached to the chains 10 and arranged in pairs. The pinions 6 are provided with shafts 22 which are formed on the shanks of the meat carriers or forks 23 which may be provided with a plurality of prongs which project horizontally between the pinions through which the meat passes. One of the prongs, prong 24, is long enough to project into the wheel 6 on the opposite side. In this manner the forks or carriers support the meat for moving the meat about the machine. Spacers 25 are provided for holding the meat at the right position and for spacing the prongs apart so that the prongs will remain parallel to each other. The prong 26 is held in the horizontal position by the pair of wheels 6. The spacers 25 are moved to the required positions and held in such positions by set screws 27.

The seasoning liquids are contained in pans or troughs 28 and these troughs are so positioned that the meat which is being cooked or roasted by moving about the machine will be carried down into the pan on each trip about the machine. The pan 28 is supported on bracket tracks 29 which are attached to the frame members 16. The pan 28 may be supported on either one of the tracks 29. The forks or carriers 23 are held in position by set screws 30. As the traveling chains carry the meat about the machine, the meat will be dipped into the liquid in the pan 28.

The drawings show electric heaters 31 arranged on one side of the machine for cooking the meat. Reflectors 32 serve to throw the heat on the passing meat to be roasted or cooked. The liquids are thus automatically basted or applied to the meat by the machine without the attention of an operator. A casing of transparent material incloses the working mechanism on the sides and front for the protection of the meat being cooked.

What we claim is,—

1. A roaster comprising a frame provided with cross-bars, a shaft in the upper part of said frame and a shaft in the lower part of said frame for causing relatively long vertical travel of material to be cooked and bearings for said shafts mounted on said cross-bars, sprocket wheels rigid with said shafts and means for driving the lower shaft, pairs of sprocket chains mounted on and driven by said sprocket wheels with said chains running parallel to each other, rotary meat holders carried by said chains and horizontally disposed, means for revolving said holders as they are moved by said chains, a pan for containing seasoning liquids in the path of said holders, and means disposed adjacent to the vertical travel of said holders for cooking the meat carried by said holders.

2. A roaster comprising a frame and casing provided with cross-bars, shafts journaled in the upper and lower parts of said frame for causing relatively long vertical travel of material to be cooked and provided with bearings mounted on said cross-bars, pairs of endless carrier sprocket chains and pairs of sprocket wheels rigid with said shafts and driving said chains, meat carrying holders horizontally disposed and operatively connected to said chains, means for revolving said holders as they are moved by said chains consisting of pinions rigid with said holders and racks rigid with said frame and parallel to the vertical travel of said chains, a pan disposed in the path of said carriers for carrying seasoning liquids for applying to meat carried by said holders, and means disposed adjacent to the travel of said holders for cooking meat carried by said holders.

3. A roaster comprising a frame and a casing provided with cross-bars, shafts journaled in the upper and lower parts of said frame for causing relatively long vertical travel of material to be cooked, and provided with bearings mounted on said cross-bars, pairs of carrier sprocket chains and pairs of sprocket wheels rigid with said shafts and driving said chains, meat carrying holders horizontally disposed and operatively connected to said chains, means for revolving said holders as they are carried by said chains consisting of pinions rigid with the holders and racks adjacent to said chains and parallel to the vertical travel of said chains for engaging and driving said pinions, a pan carrying seasoning liquid in the path of said holders mounted on said frame, and means disposed adjacent to the vertical travel of said holders for cooking meat carried by said holders.

4. A roaster comprising a frame and a casing provided with cross-bars horizontally disposed, shafts journaled in the upper and lower parts of said frame for causing relatively long vertical travel of material to be cooked and provided with bearings mounted on said cross-bars, pairs of carrier sprocket chains and pairs of sprocket wheels rigid with said shafts and driving said chains, meat carrying holders horizontally disposed and provided with shanks operatively connected to said chains, means for revolving said holders as they are carried by said chains consisting of pinions rigid with said shanks and stationary racks adjacent to said chains for engaging and driving said pinions as said chains move said pinions against the racks, spacers mounted on said holders, a pan carrying seasoning liquids in the path of said holders mounted on said frame, and means disposed adjacent to the vertical travel of said holders for cooking meat carried by said holders.

In testimony whereof, we set our hands, this 1st day of December, 1925.

ATHANASIOS PANAJIOTAROS.
MORTIMER JONES.